(12) United States Patent
Walters

(10) Patent No.: US 6,840,541 B2
(45) Date of Patent: Jan. 11, 2005

(54) TRAILER LEVEL

(75) Inventor: Duane Walters, Marshall, MI (US)

(73) Assignee: Barker Manufacturing Co., Battle Creek, MI (US)

(*) Notice: Subject to any disclaimer, the term of this patent is extended or adjusted under 35 U.S.C. 154(b) by 0 days.

(21) Appl. No.: 10/330,942

(22) Filed: Dec. 27, 2002

(65) Prior Publication Data

US 2003/0122347 A1 Jul. 3, 2003

Related U.S. Application Data

(60) Provisional application No. 60/344,178, filed on Dec. 28, 2001.

(51) Int. Cl.[7] .................................................. B60S 9/08
(52) U.S. Cl. ....................... 280/763.1; 254/420; 33/385
(58) Field of Search ............................. 280/762, 763.1, 280/764.1, 765.1; 254/418, 420; 33/377, 378, 379, 380, 381, 382, 383, 384, 385, 386, 387, 388, 389, 390

(56) References Cited

U.S. PATENT DOCUMENTS

| | | | | |
|---|---|---|---|---|
| 2,660,804 A | * | 12/1953 | Mundy | 33/373 |
| 2,970,381 A | * | 2/1961 | Pierce | 33/370 |
| 3,146,529 A | * | 9/1964 | Ogden | 33/370 |
| 3,857,188 A | * | 12/1974 | Foster et al. | 33/388 |
| 3,885,813 A | * | 5/1975 | Kern | 280/763.1 |
| 4,542,592 A | * | 9/1985 | Hopkins | 33/386 |
| 5,791,676 A | * | 8/1998 | Jones | 280/477 |
| 5,806,196 A | * | 9/1998 | Gibbs et al. | 33/333 |

* cited by examiner

Primary Examiner—Kevin Hurley
(74) Attorney, Agent, or Firm—Flynn, Thiel, Boutell & Tanis, P.C.

(57) ABSTRACT

A trailer tongue arrangement is provided having a power jack. The power jack is removably engaged with the tongue and includes a circular level unit thereon which indicates a level condition in the front-to-back and side-to-side directions.

10 Claims, 6 Drawing Sheets

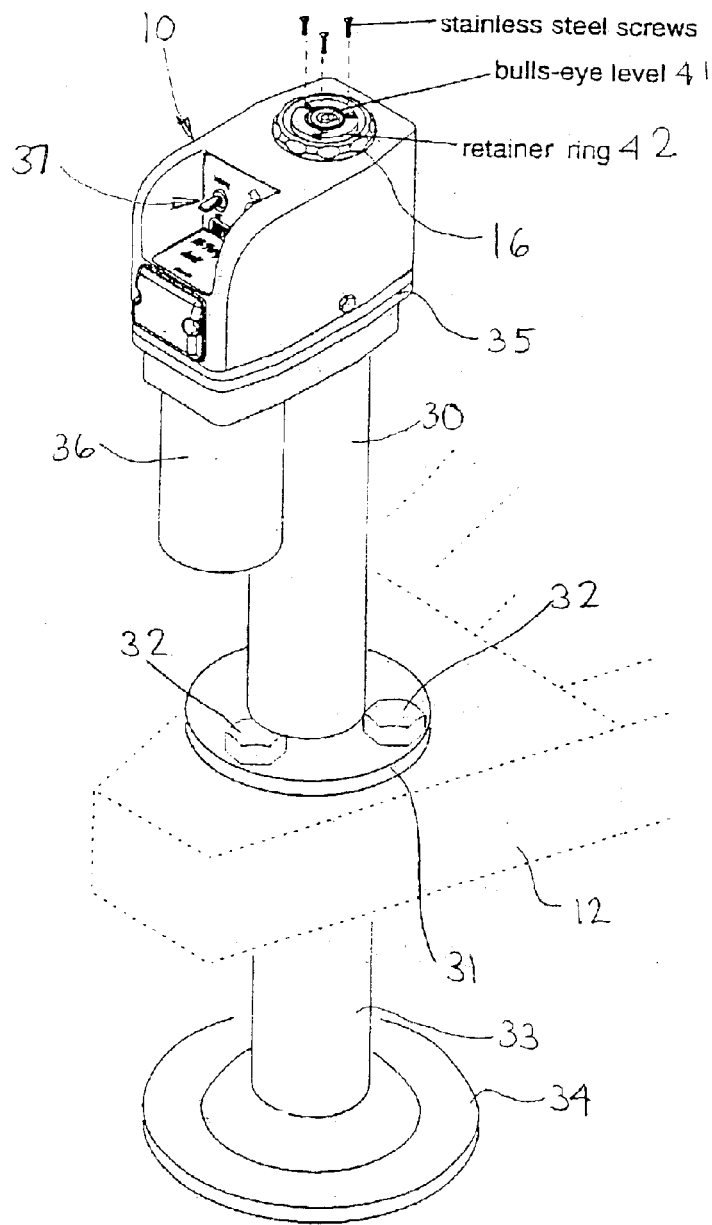
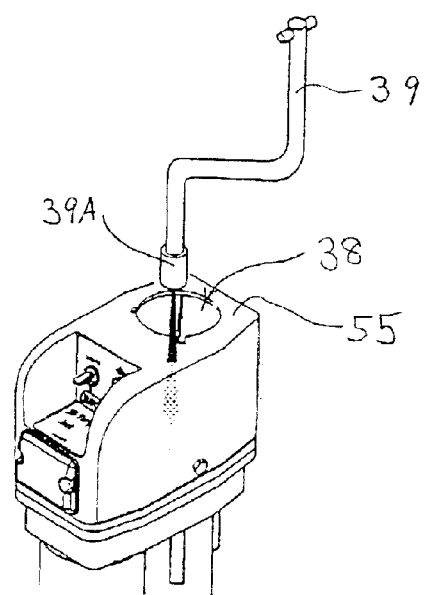
FIG. 3
FIG. 4

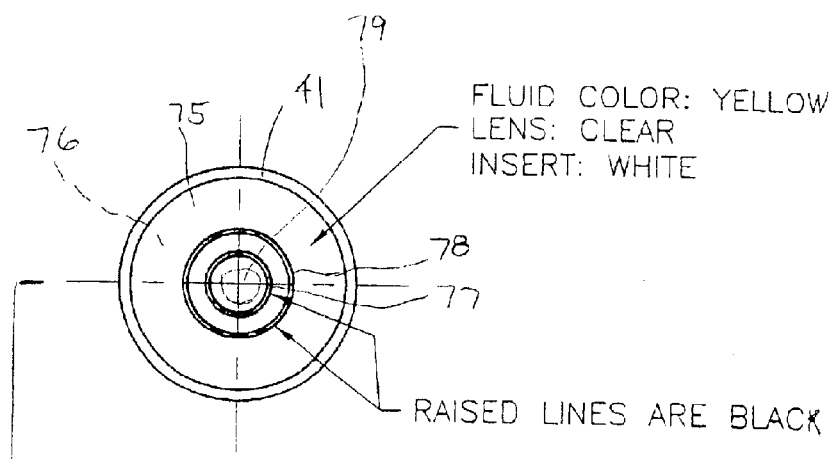
FLUID COLOR: YELLOW
LENS: CLEAR
INSERT: WHITE
RAISED LINES ARE BLACK
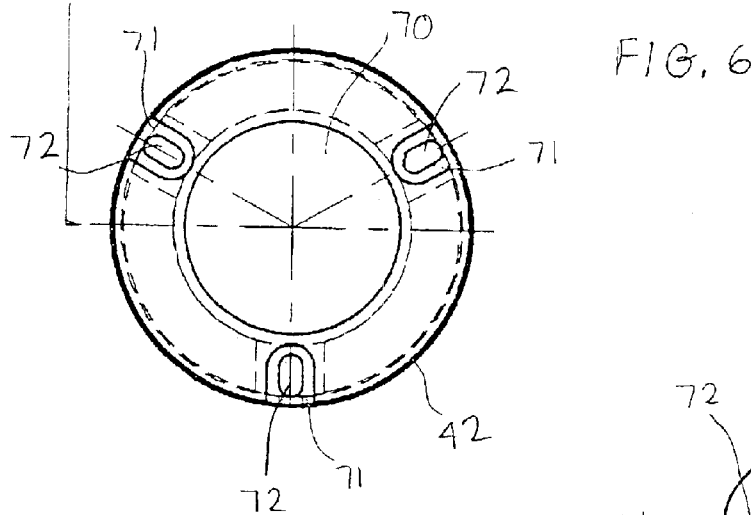
FIG. 6
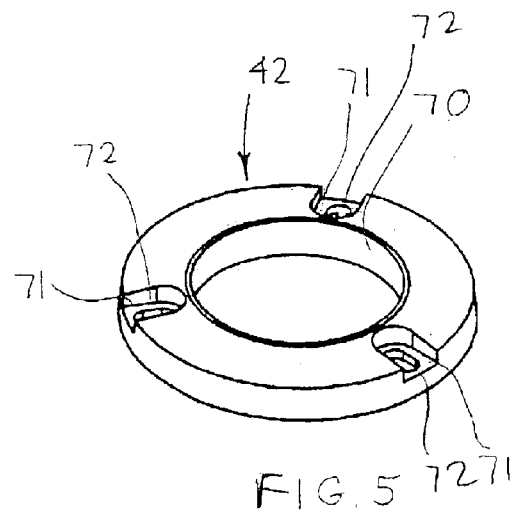
FIG. 5
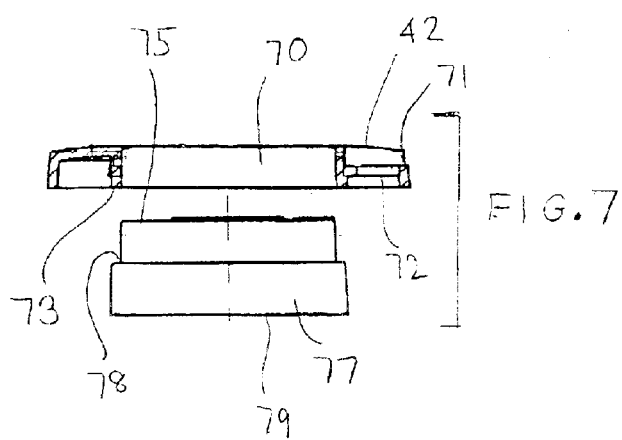
FIG. 7

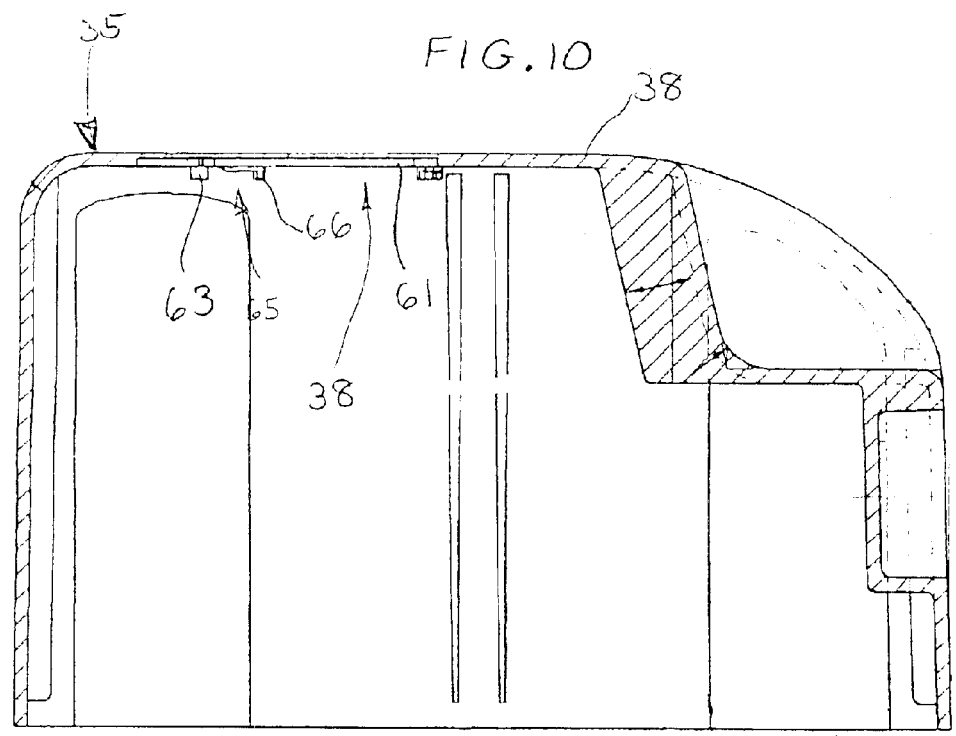
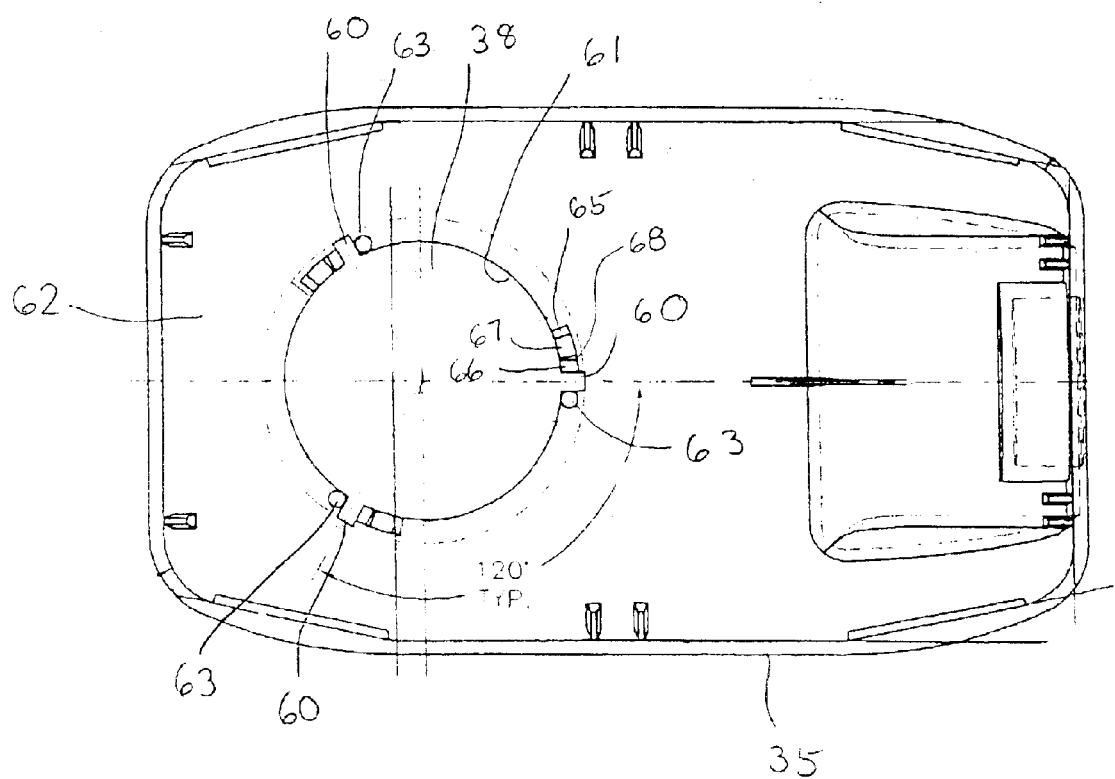

US 6,840,541 B2

TRAILER LEVEL

CROSS REFERENCE TO RELATED APPLICATION

This application claims the benefit of U.S. Provisional Application No. 60/344,178, filed Dec. 28, 2001.

FIELD OF THE INVENTION

The invention relates to a level arrangement, and in particular, to a level arrangement for leveling a trailer in side-to-side and front-to-back directions.

BACKGROUND OF THE INVENTION

Conventional travel trailers include a tongue projecting forwardly therefrom which includes a jack for maintaining the tongue in an elevated position. When positioning the trailer for use, it is desirable to level the trailer side-to-side and front-to-back.

It is known to provide a linear tube level on a side of the trailer to allow for leveling in the front-to-back direction while an additional tube level is provided on an end face of the trailer to level the trailer side-to-side. The jack on the trailer tongue allows the tongue to be raised and lowered for leveling of the trailer in the front-to-back direction. One difficulty associated with linear levels provided on the side and end faces of the trailer is that the operator or an assistant must check each individual level during the leveling process wherein the linear levels are located at multiple locations located remote from the jack.

While trailer jacks may be manually operable cranks, it also is known to provide a high-powered jack which has an electric motor therein to automatically raise and lower the tongue by selective operation of control switches.

It is an object of the invention to provide a leveling arrangement which allows for more efficient leveling of the trailer particularly for a powered jack.

The invention relates to a level that is provided on the tongue and preferably, mounted on a power jack. This single level is a circular or bulls-eye level that serves as a level indicator for multiple directions and specifically, the side-to-side and front-to-back directions. The inventive level arrangement is adjustable to allow for calibration of the level when the level is first installed.

Other objects and purposes of the invention, and variations thereof, will be apparent upon reading the following specification and inspecting the accompanying drawings.

BRIEF DESCRIPTION OF THE DRAWINGS

FIG. 3 is a perspective view of the power jack with an inventive level unit and mounted to the trailer tongue.

FIG. 4 is a perspective view of the power jack with the level unit removed therefrom.

FIG. 5 is a perspective view of a retaining ring for a bulls-eye level.

FIG. 6 is an exploded plan view of the level and the retaining ring therefor.

FIG. 7 is an exploded side view in cross-section of the level and retaining ring.

FIG. 10 is a side cross-sectional view of a housing for the power jack.

FIG. 11 is a bottom view of the jack housing.

Figure 1:
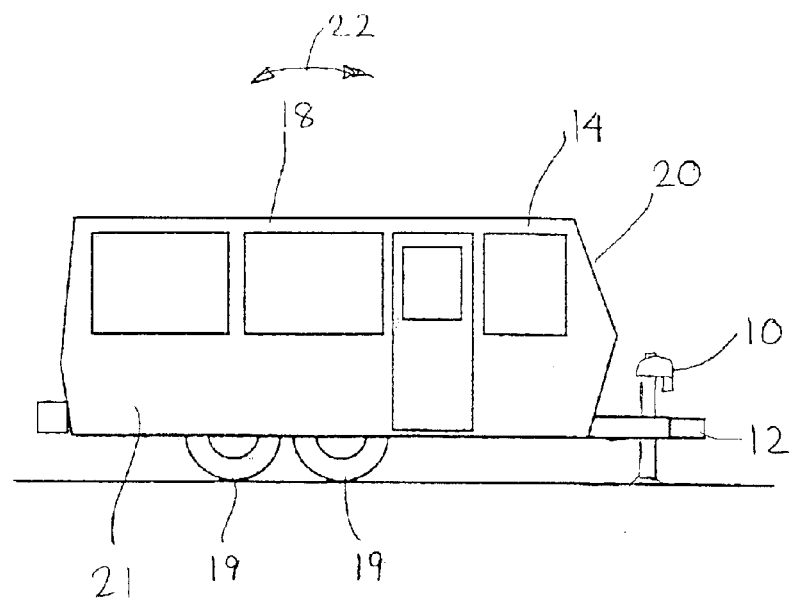
FIG. 1 is a side elevational view of a trailer having a power jack on the tongue.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, the invention relates to a jack unit 10 which is mounted to a hitch tongue 12 of a trailer 14. As seen in FIG. 3, the jack 10 includes a level unit 16 mounted thereto which level unit 16 is useable for leveling the trailer 14 in both the front-to-back direction and the side-to-side direction.

Figure 2:
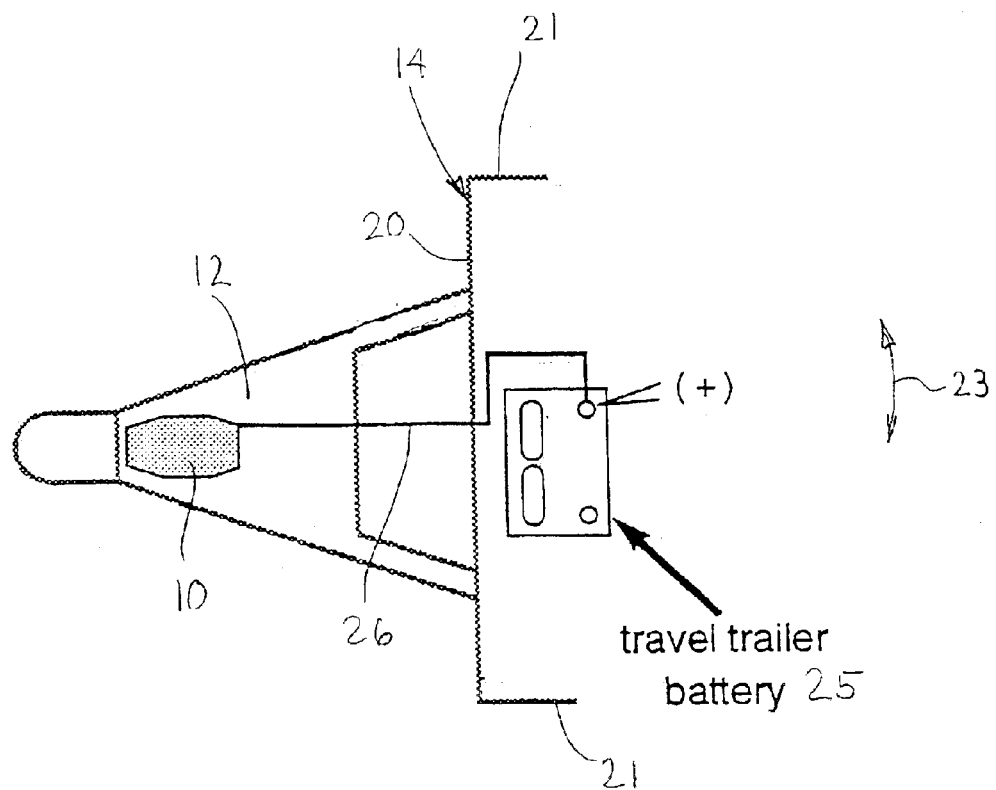
FIG. 2 is a partial plan view of the trailer and tongue.

Generally, the trailer 14 (FIG. 1) is of a standard construction having a trailer body 18 supported on wheels 19 wherein the tongue 12 projects forwardly from a front end 20 of the trailer 14. The trailer body 18 further includes side walls 21. The front-to-back direction is generally indicated by reference arrow 22 in FIG. 1 and the side-to-side direction is generally indicated by arrow 23 in FIG. 2.

The jack unit 10 of the invention is an electrically driven unit that is powered by an existing travel trailer battery 25 through a cable 26 or by the towing vehicle itself. Referring to FIG. 3, the jack unit 10 includes a vertical fixed column or post 30 that is mounted to the tongue 12 by an annular mounting flange 31 through bolts 32. The jack unit 10 further includes an extendable vertical column or post 33 which is telescopingly engaged with the fixed column 30 and has a support plate or foot 34 at the bottom end thereof. The upper end of the fixed column 30 includes a housing 35 and an electric motor 36 which is connected thereto. The motor is controlled by control switches 37 and drives an arrangement of gears and an internal threaded shaft. This drive arrangement is known and further description thereof is not necessary.

The jack unit 10 further includes the level unit 16 mounted thereto. Referring to FIG. 4, the level unit 16 is removable therefrom to expose an access port 38 through which the lower end 39A of a hand crank 39 may be inserted into an interior cavity defined within the housing 35. The lower end 39A of the hand crank is engageable with the internal drive shaft so that the extendable column 33 can be extended and retracted manually in the event of a power outage.

Figure 8:
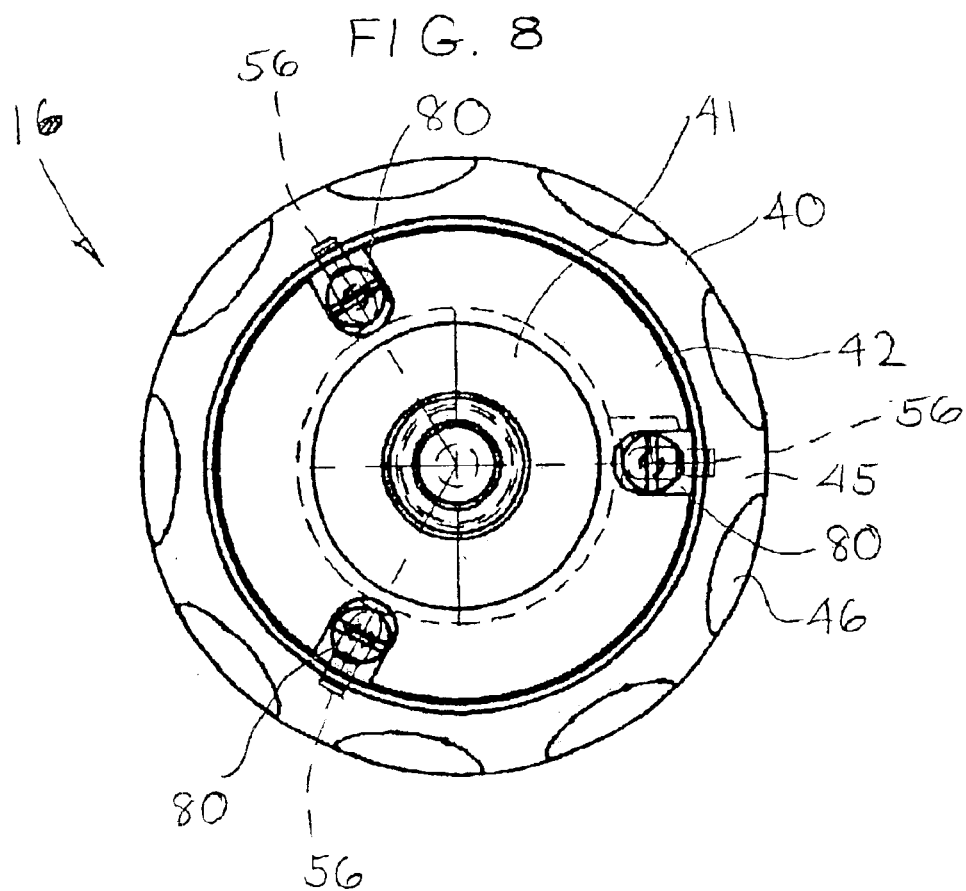
FIG. 8 is a plan view of the level unit.

Referring to FIGS. 3 and 8, the level unit 16 is removably mounted to the housing 35 and is adapted to indicate a level condition in multiple directions and specifically, both the front-to-back direction 22 and the side-to-side direction 23 as described in further detail herein. Generally, the level unit 16 comprises an outer mounting ring 40, a bulls-eye level 41 and a retainer ring 42 which supports the level 41 and adjustably mounts the level 41 to the mounting ring 40.

Figure 9:
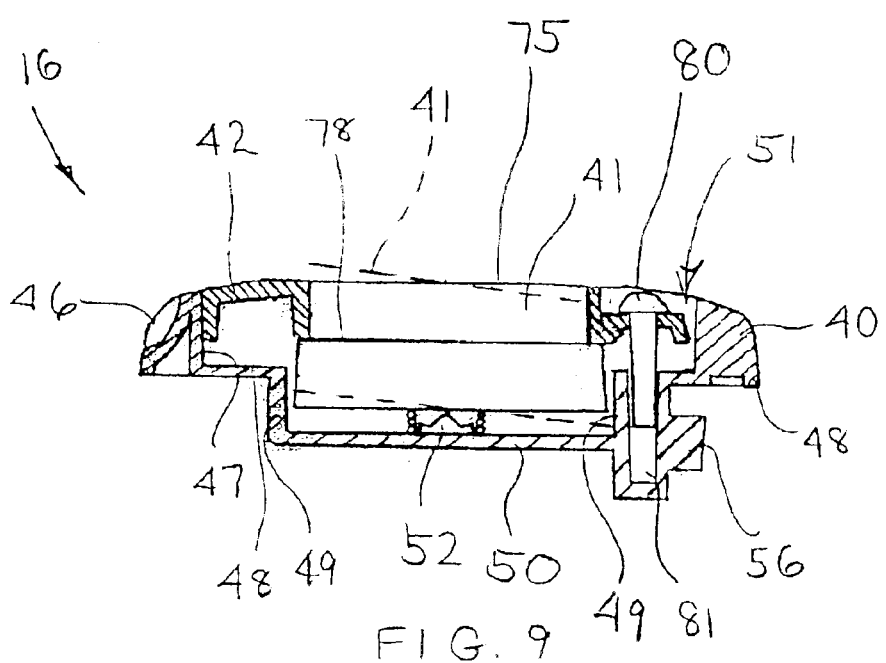
FIG. 9 is a side cross-sectional view of the level unit.
Figure 12:
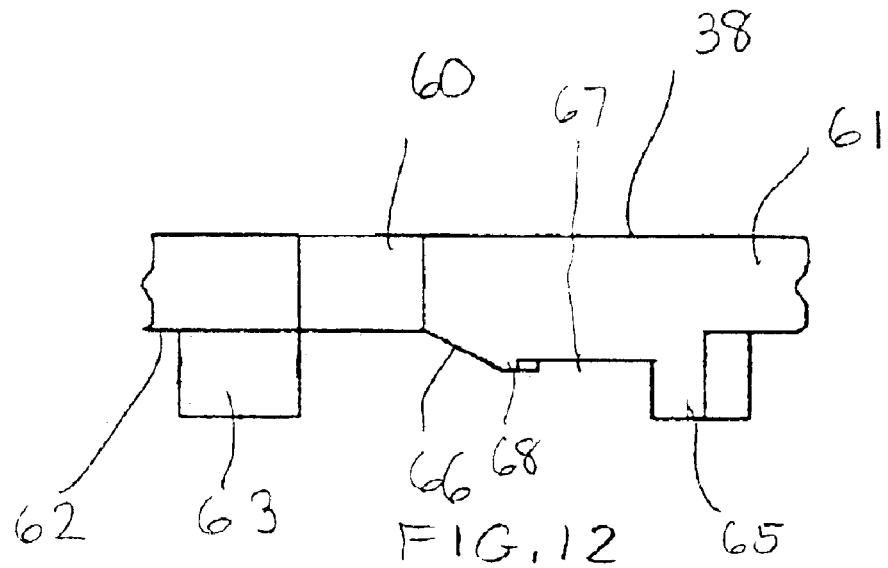
FIG. 12 is an enlarged side view of a lock formation on the housing.
Figure 13:
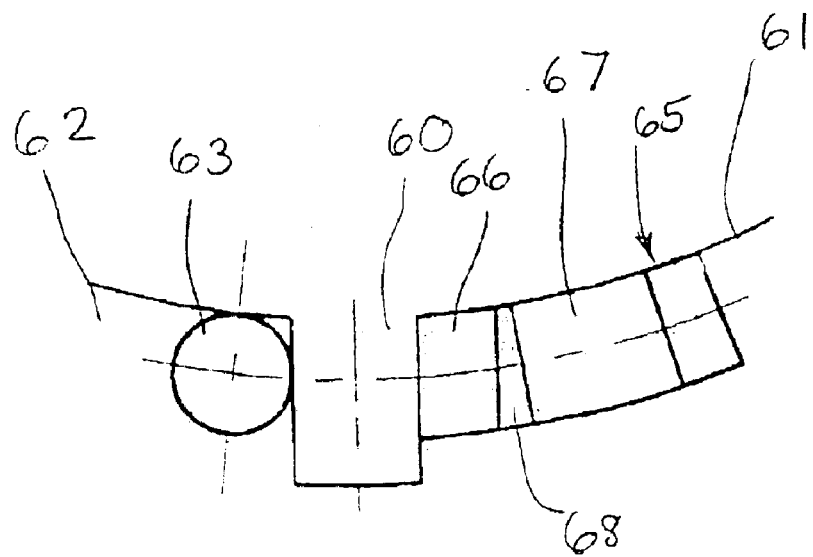
FIG. 13 is an enlarged bottom view of the lock formation.

More particularly as to FIGS. 8 and 9, the mounting ring 40 includes an outer wall 45 which is provided which concave depressions 46 that are circumferentially spaced apart to facilitate manual gripping and rotation of the mounting ring 40. The outer wall 45 extends to an annular inner wall face 47 which extends downwardly to a stepped horizontal wall 48. The mounting ring 40 further includes an inner annular wall 49 which projects downwardly from the stepped wall 48 and terminates at a bottom wall 50. The mounting ring thereby defines a cylindrical pocket 51 for receiving the level 41 and retaining ring 42 therein.

The bottom wall 50 further includes a conical projection 52 which projects upwardly from the bottom wall 50 and defines a fulcrum for the level 41 so as to permit pivoting of the level 41 in multiple directions.

The lower wall 49 of the mounting flange 40 thereby defines a cylinder having an outer diameter which is smaller than the diameter of the access opening 38. This permits this lower portion of the mounting flange 40 to be inserted into the access opening 38 while the stepped wall 48 lies flat against the upper surface 55 of the housing 35.

To connect the mounting flange 40 to the housing 35, three locking tabs 56 are provided which project radially outwardly from the lower wall 49. The locking tabs 56 project radially outwardly in angularly spaced relation with an approximately 120 degree angle being defined between each circumferentially adjacent pair.

To lock the mounting flange 40 in place on the jack housing 35, the housing 35 further includes three locking formations 65 which are located on the clockwise side adjacent to each notch 60 and are adapted to cooperate with the locking tabs 56 for securing the mounting flange 40 in a fixed position. Referring to FIGS. 10 and 11, the locking formations 65 include three notches 60 which project radially outwardly from the inside diametral edge 61 of the access opening 38. The notches 60 have a size and angular spacing which corresponds to the locking tabs 56 and permits the locking tabs 56 to be inserted downwardly therethrough when inserting the lower portion of the mounting flange 40 into the access opening 38. The bottom face 62 of the jack housing 35 further includes three posts 63 which are disposed directly adjacent to the notches 60 to prevent counter-clockwise rotation of the mounting ring 40 and restrict rotation of the mounting ring 40 to the clockwise direction as described in further detail herein.

Each locking formation 65 also includes a ramp 66 along which the respective locking tabs 56 slide to pull the mounting flange 40 downwardly into tight abutting relation with the upper surface 38 of the housing 35. The formation 65 also includes a tab seat or recess 67 which is separated from the inclined ramp 66 by a lip 68. During rotation of the mounting flange 40 in the clockwise direction, the locking tabs 56 ride down the ramp 66, pass over the lip 68, and then seat within the tab recess 67. As such, the mounting ring 40 is secured in place on the housing 35.

Typically, prior to installment of the mounting ring 40 on the housing 35, the remaining components of the level unit 16 are secured to the mounting ring 40. In particular, the retaining ring 42 as illustrated in FIG. 5 includes a center bore 70 through which the level 41 is adapted to be received. The outer circumference of the retaining ring 42 is formed with three recesses 71 wherein each recess 71 includes an elongate fastener slot 72 which extends vertically therethrough. Additionally, the retaining ring 42 has a downward facing bottom surface 73.

As for the level 41, this component is able to provide an indication of level in multiple, transverse directions and preferably is a circular level which is filled with a yellow fluid. The top surface of the level 41 is a clear lens 75 and a white insert 76 is provided within the interior of the level 41. The lens 75 is formed with two concentric reference rings 77 and 78 which define the centering location of an air bubble 79 which floats within the fluid. The bubble 79 when located within the inner concentric ring 77 indicates a level condition both in the front-to-back and side-to-side directions.

The side wall 77 of the level 41 includes an annular step 78 which abuts against the bottom surface 73 of the retaining ring 42 as can be seen in FIG. 9. The upper section of the level 41 is fitted within the bore 70 and the assembly of the level 41 and retaining ring 42 is then fitted within the mounting ring 40 as seen in FIG. 9. The bottom surface 79 of the level 41 is supported vertically on the projection 52 and can tilt in any direction about the fulcrum point defined by the projection 52. Tilting of the level is generally indicated by the phantom lines in FIG. 9.

Threaded fasteners such as screws 80 are inserted downwardly through each slot 72 and threaded into a bore 81 that is formed in the mounting ring 40. As such, the screws 80 hold the retaining ring 42 and level 41 in place on the mounting ring 40. The screws 80 can be screwed individually into place in order to adjust the relative tilt of the retaining ring 42 and level 41 within the mounting ring 40 which allows for calibration of the level unit 16.

More particularly, the level unit 16 preferably is provided as a component of the power jack 10 and comes pre-installed on the housing 35. Upon the first installation of the jack 10 on the trailer tongue 12, it may be necessary to calibrate the level unit 16. This is done by first using a separate level to level the trailer 14 in the front-to-back direction 22 and the side-to-side direction 23. For example, a separate level could be placed on a flat surface within the trailer 14, such as a flat surface on a counter top, refrigerator or table wherein the trailer 14 is manually leveled in the two primary directions. If the bubble 79 on the level 41 is not located centrally within the inner concentric ring 77, it is necessary to calibrate or adjust the angular orientation of the level 40. This is done by selectively screwing the adjustment screws 80 either inwardly or outwardly to adjust the tilt of the level 41 on the fulcrum projection 52. Depending upon which of the three screws 80 is adjusted, the level 41 can be adjusted either front-to-back, side-to-side or a combination of the two directions. Once this initial calibration is completed, use of the separate level within the trailer or any existing levels on the trailer 14 is no longer necessary. Rather, when traveling, the trailer 14 is first parked and the foot plate 35 of the jack 10 is positioned in supporting engagement with the ground. If the trailer 14 is not level as indicated by the bubble 79, the jack 10 can be operated to either raise or lower the tongue 12. Additionally, the trailer 14 can be further leveled from side-to-side with stabilizing jacks or spacers underneath the wheels.

As an additional advantage of the level unit 16, the level unit 16 can be removed from the housing 35 by rotating the mounting ring 40 to disengage the lock tabs 56 from their respective locking seats 67 formed in the housing 35.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A trailer leveling arrangement comprising:

a trailer having a tongue projecting therefrom;

a jack mounted to the trailer tongue for raising and lowering said tongue relative to ground elevation, said jack including a level unit mounted to the jack, said level unit including a level with a fluid contained therein and a surface indicator on the top thereof which indicates a level condition in both a front-to-back direction and a side-to-side direction, said level unit including a housing engaged to a top surface of said jack, said housing including said level unit supported therein so as to permit tilting of said level and an adjustable fixing arrangement which fixes said level in a fixed orientation while permitting selected tilting of said level for calibration thereof.

2. The trailer leveling arrangement according to claim 1, wherein said level comprises a bulls-eye level having a bubble which floats centrally therein and said surface indicator comprising an indicator ring on a top surface of said level through which said bubble is viewable to level said trailer in said front-to-back and side-to-side directions.

3. A trailer leveling arrangement comprising:

a trailer having a tongue projecting therefrom;

a jack mounted to the trailer tongue for raising and lowering said tongue relative to ground elevation, said jack including a level unit mounted to the jack, said level unit including a level with a fluid contained therein and a surface indicator on the top thereof which indicates a level condition in both a front-to-back direction and a side-to-side direction, said jack being removably mounted on said trailer tongue and having an upper housing with an upward facing top wall, said level unit being removably mounted within said top wall.

4. The trailer leveling arrangement according to claim 3, wherein said level is adjustable to calibrate said level relative to said jack.

5. The trailer leveling arrangement according to claim 3, wherein said level is a bulls-eye level which permits leveling of said trailer in said front-to-back and side-to-side directions.

6. The trailer leveling arrangement according to claim 3, wherein said level unit is removably fixed to said jack.

7. The trailer leveling arrangement according to claim 3, wherein said jack is removably engaged to said trailer tongue by fasteners and said upper housing encloses a drive motor and has an opening extending through said top wall which is adapted to removably receive a manual crank for manually driving said drive motor, said opening having said level unit removably engaged therewith to enclose said opening while permitting removal of said level unit for said manual cranking of said drive motor.

8. A trailer leveling arrangement comprising:

a trailer having a tongue projecting therefrom;

a jack mounted to the trailer tongue for raising and lowering said tongue relative to ground elevation, said jack including a level unit mounted to the jack, said level unit including a level with a fluid contained therein and a surface indicator on the top thereof which indicates a level condition in both a front-to-back direction and a side-to-side direction, said level being movably supported within said level unit to permit adjustment of an orientation of said level within said level unit to calibrate said level in the front-to-back and side-to-side directions.

9. A method of leveling a travel trailer, said travel trailer comprising a trailer frame with wheels supported thereon for rolling engagement with a support surface, and said trailer frame including a tongue projecting forwardly therefrom to permit towing of said travel trailer by a vehicle, said trailer tongue including a jack mounted thereto which is adapted to raise and lower said tongue relative to a ground elevation, the method comprising the steps of:

providing said jack with a housing and a level unit that includes a jack level which indicates a level condition of said trailer in both a front-to-back direction and a side-to-side direction, said jack level being pivotally supported within said housing;

calibrating said level unit by leveling said travel trailer in the front-to-back and side-to-side directions through a calibrating level separate from said level unit and thereafter adjusting an orientation of said jack level within said level unit to indicate that said trailer is in a leveled position in the front-to-back and side-to-side directions, said calibrating of said level unit further comprising the step of displacing an edge of said jack level vertically to pivot said jack level within said housing until said surface indicator indicates a level condition in both of said front-to-back and side-to-side directions;

setting up said trailer by positioning said trailer on said support unit and actuating said jack to raise and lower said trailer tongue; and leveling said trailer in the use position by viewing of said surface indicator of said level unit and adjusting leveling of said trailer through use of said level unit until said surface indicates a level condition for said trailer in both the front-to-back and side-to-side directions.

10. The method according to claim 9, wherein said level unit is removably attached to said jack and said level unit includes an adjustment arrangement for adjusting the orientation of said level within said jack level unit, said method further including the steps of adjusting the position of said jack level within said level unit with said adjustment arrangement.

* * * * *